INVENTOR.
CONRAD R. HILPERT
BY
James E. Nilles
ATTORNEY

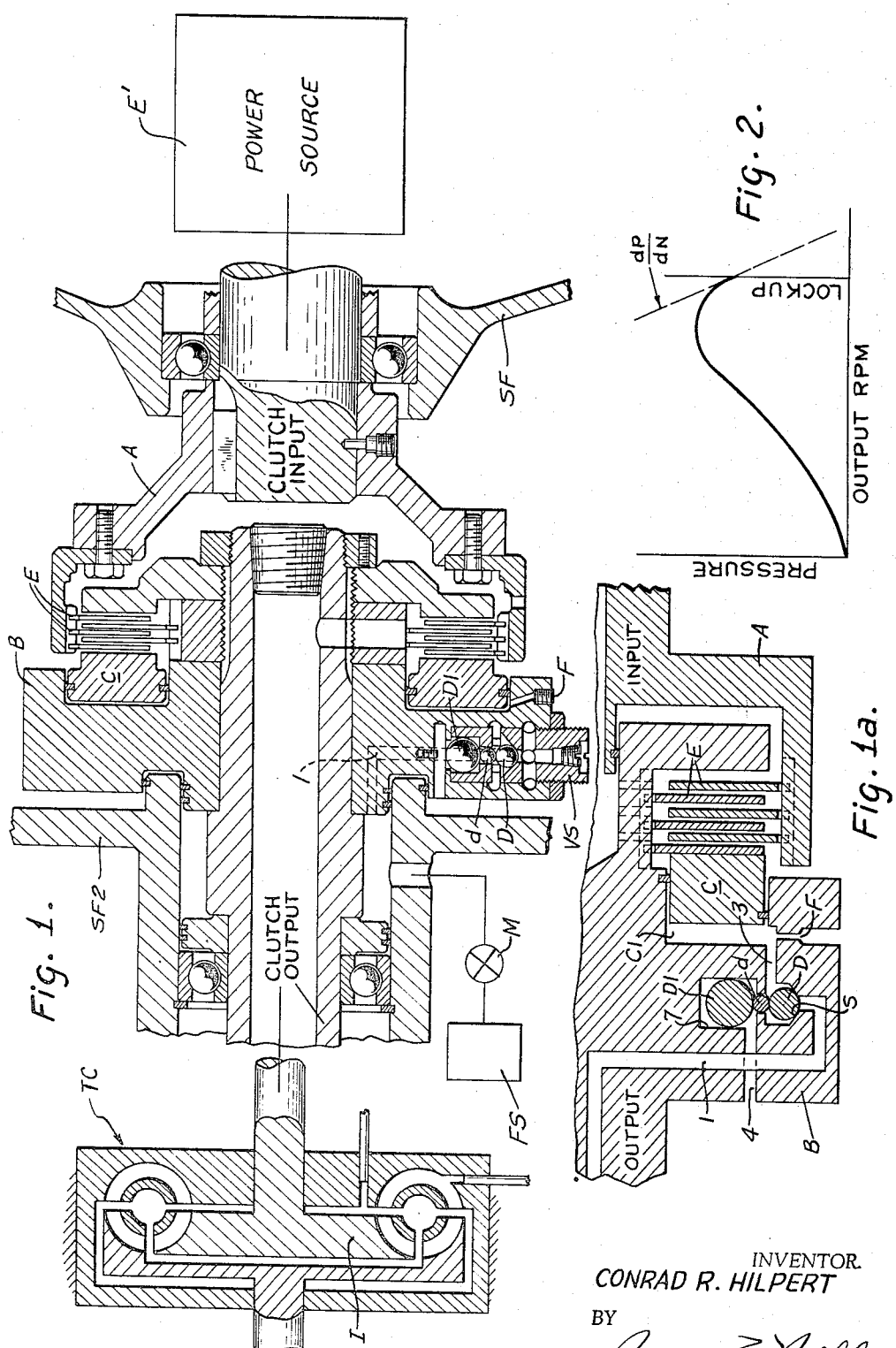

INVENTOR.
CONRAD R. HILPERT
BY:
James E. Nilles
ATTORNEY

United States Patent Office 3,358,796
Patented Dec. 19, 1967

3,358,796
FRICTION CLUTCH HAVING CENTRIFUGALLY OPERATED BALL VALVE MEANS
Conrad R. Hilpert, Winnebago, Ill., assignor to Twin Disc, Incorporated, a corporation of Wisconsin
Filed May 5, 1966, Ser. No. 547,912
10 Claims. (Cl. 192—3.33)

This invention relates generally to friction clutches having centrifugally operated valve means for controlling the speed of either the input or output member of the clutch. More specifically, the invention relates, among other things, to an improved centrifugally operated ball valve means. The invention finds particularly utility when used in combination with a torque converter.

This invention is in the nature of an improvement over the device shown in my copending U.S. application Ser. No. 528,422, filed Feb. 18, 1966, and which issued as Patent No. 3,352,395 on Nov. 14, 1967, entitled, "Friction Clutch Having Centrifugally Operated Valve Means."

In devices of the charatcer to which the present invention relates, such as the said patent application, under some operating circumstances the valve means is not always sufficiently sensitive or responsive in anticipating the function to be perforced by the valve means, due primarily to friction developed by the sliding valve elements and/or the improper seating and sealing of the slidable valve element.

Accordingly, the object of the present invention is to provide a friction clutch having an improved centrifugally operated valve means which overcomes the above mentioned shortcomings. The present invention also provides a valve means of the above type which is economical to manufacture as it eliminates many manufacturing processes, is relatively simple to construct, and the valve element adjusts automatically on its seat, reduces and eliminates frictional forces between the relatively movable valve parts, and is exceptionally responsive and sensitive in performing its controlling functions, particularly at higher speeds and higher values of angular acceleration.

The present invention provides a friction clutch having a centrifugally operated valve means which results in increased hydraulic stability in the system, due in great measure to its ability to permit the hydraulic pressure on the clutch actuating piston to decrease faster than the changing coefficient of friction in the clutch plates can cause acceleration of the driven member of the clutch. Consequently, exceptionally good control of the clutch is obtained.

The centrifugal valve of the present invention utilizes balls as the shiftable valve element for providing the above mentioned desirable characteristics and functions. If a single, radially shiftable ball is used for sealing against the valve seat, it must be of sufficient weight to give centrifugal compensation to the clutch by causing a decreasing clutch apply force as the rotational speed rises for any fixed supply pressure, thereby causing the bleed orifice to flow less as the speed increases, which in turn results in lower fluid consumption. This feature is particularly desirable for use with a torque converter driven clutch, that is, to apply the clutch with increasingly greater pressure as the speed decreases. However, a single valve ball of the size necessary to provide this control would be so large as to not maintain its proper seat at high angular accelerations, that is to say, the included angle of the valve seat would be so large that the ball would inadvertently roll off the seat at high accelerations. Therefore, the present invention contemplates the use of a plurality of balls for any one valve means whereby a valve seating ball of sufficiently small diameter is used which will not inadvertently roll off its seat when subjected to high angular acceleration, causing a regenerative system and clutch that will "bite." The use of a sufficiently small, properly seated ball is possible when it is used with a larger ball having the necessary weight to provide a measure of centrifugal compensation which causes a decreasing clutch apply force as the rotational speed rises for any centerline fluid supply pressure.

Another aspect of the invention contemplates the use of such a valve for a clutch incombination with and ahead of a torque converter. With this particular combination it is possible to control the input power to the torque converter, i.e., it is possible to precisely control the input speed and input power to the torque converter.

These and other objects and advantatges of the present invention will appear hereinafter as this disclosure progresses, reference being had to the accompanying drawings, in which:

FIGURE 1 is a longitudinal cross sectional view of a clutch mechanism embodying the present invention, and shown as driving a torque converter, certain parts being shown as broken away, in section, or of simplified construction for clarity in the drawings;

FIGURE 1a is a schematic of the valve shown in FIGURE 1;

FIGURE 2 is a graph of the required pressure on the clutch actuating piston plotted against the output speed, for a modulated torque converter with which the invention finds particular utility;

Figure 3:
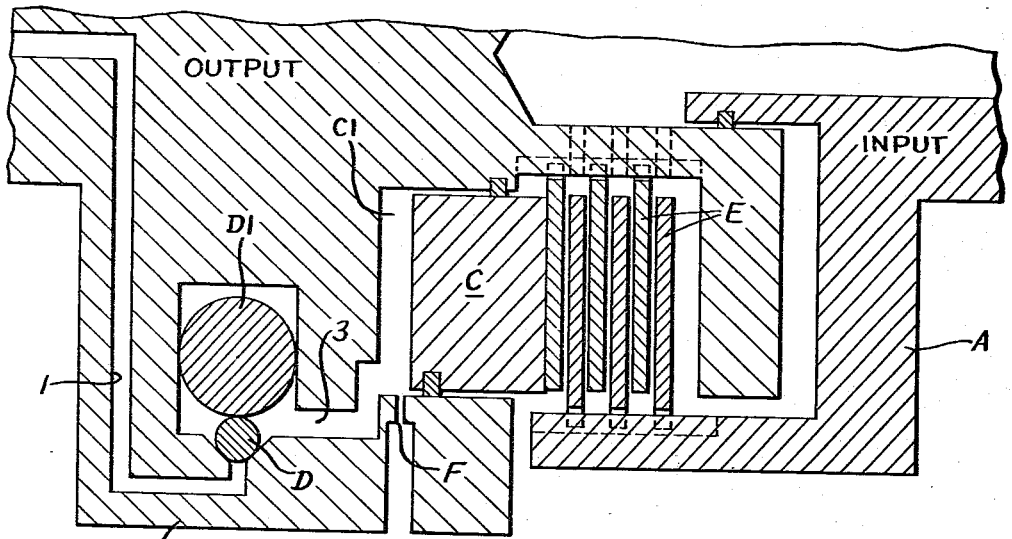
FIGURE 3 is a schematic, longitudinal, cross sectional view of a clutch mechanism embodying the present invention, and showing a modification from the FIGURE 1 device.
Figure 4:
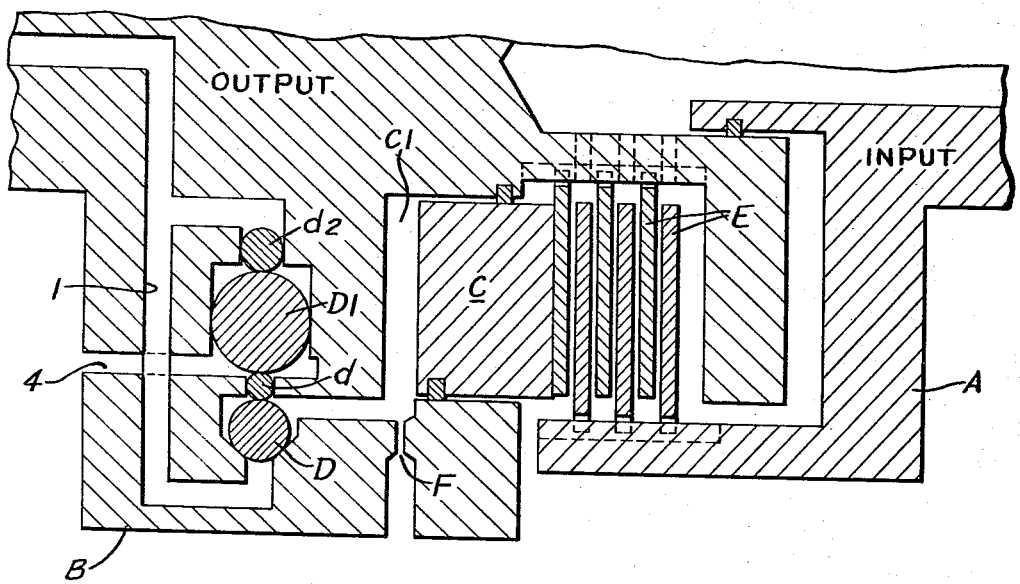
FIGURE 4 is a fragmentary view of a portion of the FIGURE 1 device but showing a further modification; consisting of a counterbalancing ball.

In the following disclosure, schematic views have been used to illustrate the invention without unduly complicating the drawings, and it will, therefore, be appreciated that in the manufacture of the various parts for production, they will be fabricated or formed of several parts.

The centrifugally actuated valve D is carried by either the rotatable input or output member whose speed it is desired to control. The hydraulically operated piston C for causing slipping engagement of the friction clutch plates E can be carried on either the input member or output member of the clutch; the actuating piston C can be carried on the same member or, alternatively, on a different member from that on which the centrifugal valve D is located.

FIGURE 1

Referring more specifically to FIGURE 1, a power source, for example an engine E', drives the clutch input member A which is rotatably mounted on support frame SF by anti-friction bearings and the output member B is also journalled on conventional anti-friction bearings on support frame SF2. The clutch output member B in turn drives the impeller I of the torque converter TC.

Clutch actuating piston C is slidable in the clutch actuating chamber C1, and interleaved friction plates E provide a slippable connection between the input and output members, some of these plates being axially splined to each of the members.

Control fluid pressure is supplied from a fluid source

FS and through a fluid pressure control means M and then via supply passage 1 to valve D.

The centrifugal operated control valve D is located on that particular rotatable member A or B whose speed it is desired to control. Any number of these valves may be used as necessary or desired, and they are slidable in their respective sleeves VS, which sleeves in turn may be threadably engaged in the controlled member.

As will more fully appear, a fluid bleed orifice F bleeds the piston chamber C1 at all times, thus causing a release of the clutch as pressure supply fluid is shut off. This orifice must be capable of bleeding off fluid faster than the coefficient of friction can build up in the plates, in order to control properly by immediately reducing pressure in chamber C1 and preventing a time lag by the valve in controlling the clutch.

The centrifugally actuated valve D is a conventional steel ball and is radially shiftable, in the output member B for example as shown in FIGURES 1 and 1a, and is adapted to bear against the valve seat S so as to block the flow of pressure fluid through the supply passage 1, fluid pressure being supplied via passage 1 from the source FS. Passage 3 places the supply passage 1 in fluid communication with the clutch apply chamber C1 when the valve D is open, i.e., off its valve seat S. Centrifugal force biases or forces the valve D against the valve seat to the closed position. If the control pressure is passage 1 is of sufficient magnitude, valve D will be urged radially inwardly, against centrifugal force, to open passage 1 to communication with passage 3, thus permitting pressure fluid to enter chamber C1, which in turn urges piston C to the right (as viewed in the drawings) toward the clutch engaging position. As previously mentioned, the bleed orifice F bleeds the piston chamber C1 at all times, thus causing the release of the clutch if the pressure fluid supply is shut off, and the orifice F must be capable of bleeding off pressure fluid faster than the coefficient of friction within the clutch can build up, in order to provide proper control by immediately reducing pressure in chamber C1 and prevent a time lag by the valve in controlling the clutch.

When the clutch is rotating, the radially shiftable valve D progressively shuts down the control fluid pressure as the centrifugal force acting on the valve D approaches that of the control fluid pressure. In this manner the clutch output is limited to the speed at which the control fluid pressure is equal to the centrifugal force acting on the valve D. The only effect which a change in the coefficient of the friction of the clutch will have is to change the pressure of the fluid in chamber C1 that is acting on the piston C.

It should be noted that the valve D is of sufficiently small diameter so that its seat S can be formed by an angle which is sufficiently small, whereby the ball valve D will not inadvertently roll off its seat at high acceleration. This is possible by the use also of a large ball D1 which provides the necessary weight to cause a decrease in the clutch apply force as the rotational speed increases. A vent 4 is provided for bore 7 for the ball D1. Intermediate ball d acts to transmit force between the two balls D and D1.

The ball D1 slides in its bore 7 without any friction, as it can roll in the bore if necessary. The bore need not be made with any high degree of precision and can be easily formed so that no appreciable fluid can move between ball d and its bore but instead a seal is formed therebetween. Nevertheless, friction is minimized because if the ball bears against one side of the bore, the ball will actually roll in its shifting movement in the bore.

Ball D seats automatically and properly on its seat S. The balls may be of standard manufacture, and are relatively inexpensive.

FIGURE 2

FIGURE 2 is a graph of the required pressure on the clutch actuating piston plotted against the output speed (r.p.m.) for a modulated torque converter. The line $dP/dN$ (rate of pressure change) represents a plot of the equation $$dP/dN = 2\frac{H}{A_0}N - 2\frac{G}{A_0}N$$

where H and G are proportionality constants, $A_0$ is the area of the valve seat S, and N is speed in r.p.m. If the slope of this line, derived from the above equation, is steeper than the slope from the curve of FIGURE 2, a controllable clutch will result, a clutch which can function regardless of the coefficient of friction changes in the clutch plates. As the clutch speed rises, a decreasing clutch apply force occurs.

The ratio $dP/dN$ is directly related to the centrifugal force on the valve ball (or balls) and consequently if the supply pressure $P_s$ cannot be much higher than the pressure P on the clutch piston, stability of the clutch will not be possible.

FIGURE 3

FIGURE 3 is a device similar to FIGURE 2 but in which the intermediate thrust transmitting ball d is not used, nor is the vent 4 necessary. In this device the control is such that as the output member speed increases, the clutch apply pressure decreases.

FIGURE 4

This view shows the device of FIGURE 1 together with a counterbalance ball d2, which serves to counterbalance a portion of the area of valve ball D which is exposed to supply pressure. In this manner the total weight of the balls may be less without causing separation of the stack of balls. The area of ball d2 can be adjusted to any portion of the effective area of the valve ball D to give the desired reduction in total weight of the balls.

In this embodiment also, as the speed increases, the apply pressure decreases.

FIGURE 5

Figure 5:
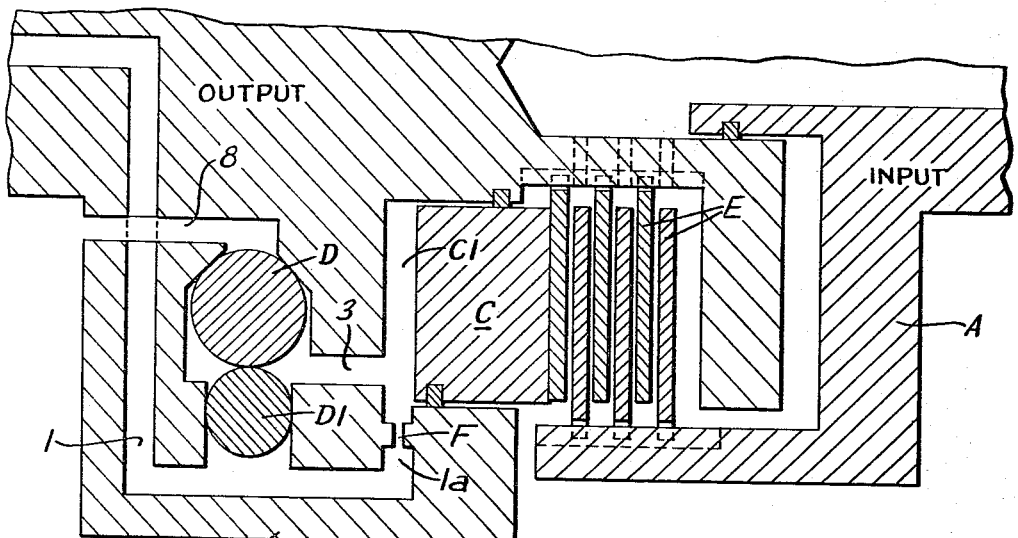
FIGURE 5 is a view similar to FIGURE 3, but being an "inversion" thereof.
Figure 6:
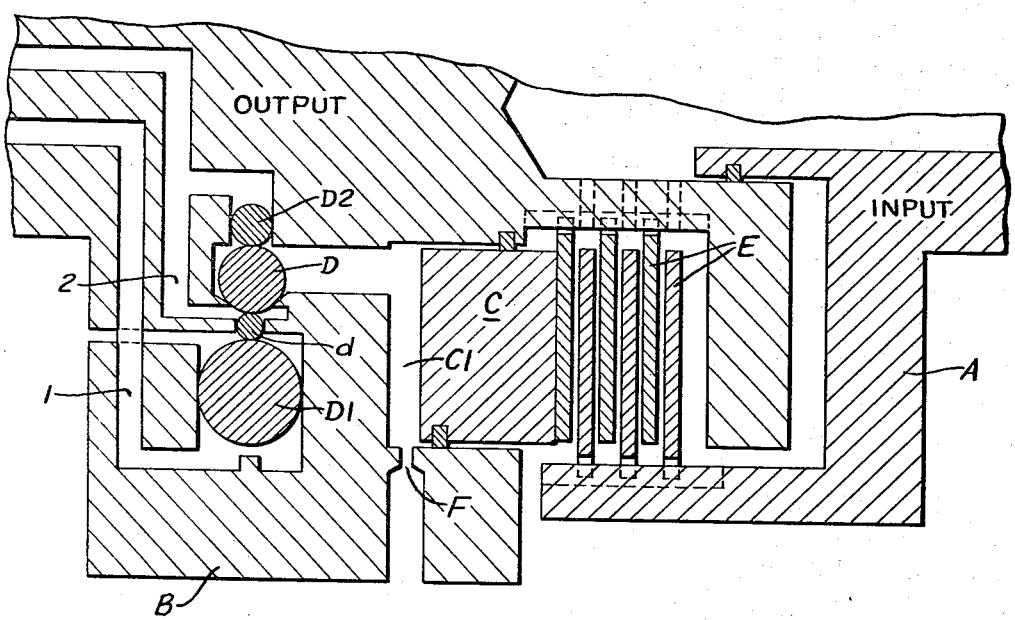
FIGURE 6 shows another modified clutch mechanism made in accordance with the present invention and having a second, separate fluid passage for supplying clutch apply pressure.

FIGURE 5 shows an "inversion" of the device of FIGURE 3 arrangement, in that the control fluid enters via passage 1 and 1a and is fed continuously to chamber C1 via orifice F, thereby applying the clutch. However, if the centrifugal force of valve D exceeds the force on it from passage 1, the fluid pressure from passage 3 will be vented through passages 3 and 8 as the valve moves radially outward. Here again, then, for each pressure in passage 1, a "balancing" speed of the output member B will be reached.

With this arrangement, it is the outflow from the chamber C1 which is controlled by the centrifugal valve D, and the slip in the friction clutch is continuously and completely controlled.

FIGURE 6

This figure illustrates a two pressure system device having a second fluid pressure passage 2 which applies fluid separately and independently of the control pressure which actuates the valve. Thus a higher and/or independent clutch apply pressure is possible, over and above the control pressure.

Control fluid pressure in passage 1 acts through ball D1 and ball d in opposition to the centrifugal force on valve ball D. The separate "apply" pressure in passage 2 is used to actuate the clutch piston C. The movement of the ball valves, all acting as a unit, controls the clutch apply pressure in passage 2 from a constant source. Ball D2 is the counterbalance ball which neutralizes the inward force of apply pressure in passage 2 on ball D.

FIGURE 7

Figure 7:
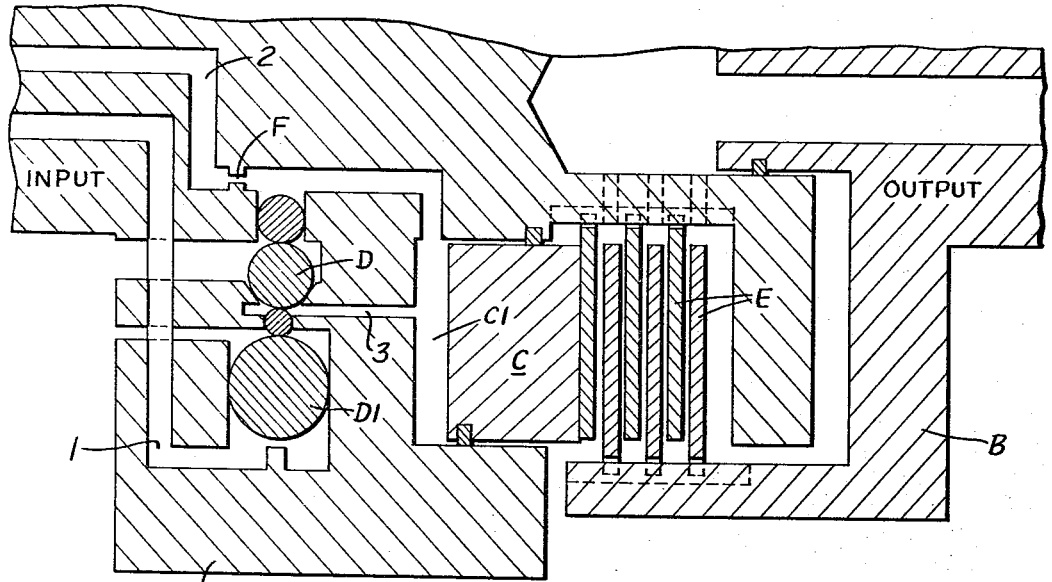
FIGURE 7 is another modified clutch mechanism wherein the input and output members are reversed.
Figure 8:
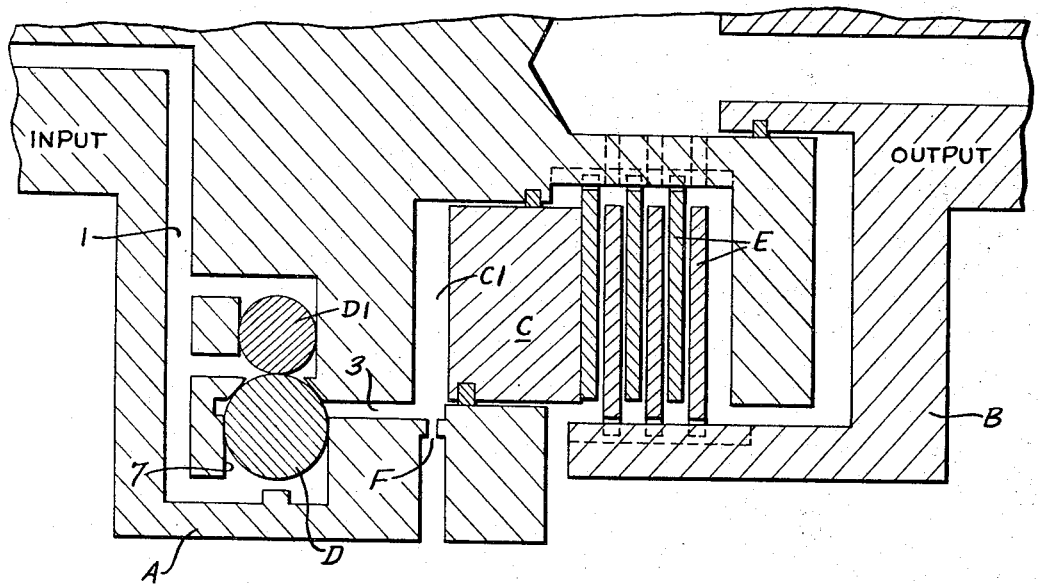
FIGURE 8 is still another modification.

FIGURE 7 shows an arrangement where the input and output members are reversed and wherein a minimum speed limit is established for the input member. This is a two pressure system in which clutch apply pressure fluid is fed through passage 2 and orifice F. If no control pressure exists in passage 1, then the ball D can close on its seat and prevent dumping of the fluid to the release passage 4. If control pressure is applied at passage 1, at a predetermined minimum speed limit the ball D1 would unseat ball D thus permitting dumping of fluid from chamber C1, permitting slipping of the clutch and pickup in speed of the input member A.

This embodiment then prevents the speed of the input member from going too low.

FIGURE 8

In this embodiment, a minimum speed limit is established for the input member A. This is a single pressure system with a continuous dump from chamber C1 through orifice F. The ball D moves in its bore 7 and as previously mentioned, fluid does not flow therebetween, and it acts to seat and close the feed passage 3 into the chamber, until centrifugal force is sufficient to unseat ball D. This decreasing speed of the input member A causes a reduction in clutch engagement and the balancing speed is adjustable by the amount of pressure in passage 1. Thus a floor or minimum speed can be established for the input member A.

Various modes of carrying out the invention are contemplated as being within the scope of the following claims particularly pointing out and distinctly claiming the subject matter which is regarded as the invention.

I claim:

1. Centrifugally controlled, friction clutch mechanism comprising: a rotatable driving member and a rotatable driven member; slippingly engageable friction clutch means between said members for establishing a slippable drive connection therebetween; hydraulically operated means for causing variable engagement of said friction clutch means; pressure fluid, centrifugally operated, control valve means in one of said members and responsive to speed changes thereof, said control valve means including a valve seat and a first radially shiftable ball adapted to sealingly engage said seat to prevent flow of fluid and controlling the amount of fluid in said hydraulically operated means, and a second ball for acting on said first ball and radially shiftable therewith; externally actuated, fluid pressure control means for supplying pressure fluid to said centrifugally operated control valve means for control thereof, and passage means placing said centrifugally operated control valve means in operative communication with said hydraulically operated means to cause variable actuation of the latter and consequent continuously controlled, slipping engagement of said friction clutch means in accordance with the rotation speed of said one of said members.

2. Mechanism as defined in claim 1 including a separate supply passage for supplying clutch apply fluid pressure to said hydraulically operated means independently of said externally actuated control means.

3. Mechanism as defined in claim 1 wherein said centrifugally operated control valve is located on the output member to maintain the rotational speed of said output member constant.

4. Mechanism as defined in claim 1 further characterized in that said centrifugally operated control valve is located on the power input member of the mechanism whereby when the speed of said input member reaches a predetermined minimum, said valve causes a reduction of pressure on the slipping of the clutch thereby decreasing the load on the input member and preventing said input member from going below said predetermined minimum.

5. Mechanism as defined in claim 1 wherein the centrifugally operated control valve means is located to control the fluid pressure input to the hydraulically operated means.

6. Mechanism as defined in claim 1 wherein the centrifugally operated control valve means is located to control the outflow from the hydraulically operated means.

7. Mechanism as defined in claim 1 further characterized in that said first ball is of smaller diameter than said second ball.

8. A power transmission comprising in combination; a source of power; centrifugally controlled, friction clutch mechanism driven by said source; a torque converter connected to and driven by said clutch mechanism; said clutch mechanism comprising, a rotatable driving member and a rotatable driven member, slippingly engageable friction clutch means between said members for establishing a slippable drive connection therebetween; hydraulically operated means for causing variable engagement of said friction clutch means; pressure fluid, centrifugally operated, control valve means in one of said members and responsive to speed changes thereof, said control valve means including a valve seat and a first radially shiftable ball adapted to sealingly engage said seat to prevent flow of fluid and controlling the amount of fluid in said hydraulically operated means, and a second ball for acting on said first ball and radially shiftable therewith; externally actuated, fluid pressure control means for supplying pressure fluid to said centrifugally operated control valve means for control thereof; and passage means placing said centrifugally operated control valve means in operative communication with said hydraulically operated means to cause variable actuation of the latter and consequent continuously controlled, slipping engagement of said friction clutch means in accordance with the rotation speed of said one of said members, whereby the input speed and power to said torque converter can be precisely controlled.

9. Mechanism as defined in claim 8 including a separate supply passage for supplying clutch apply fluid pressure to said hydraulically operated means independently of said externally actuated control means.

10. Mechanism as defined in claim 8 further characterized in that said first ball is of smaller diameter than said second ball.

References Cited

UNITED STATES PATENTS

| 2,163,203 | 6/1939 | Kegresse. | |
| 2,297,480 | 9/1942 | Kratzmann | 192—104 X |
| 2,328,092 | 8/1943 | Nutt et al. | 192—103 X |
| 2,511,518 | 6/1950 | Stephens | 192—103 |
| 3,005,529 | 10/1961 | Bochan. | |

BENJAMIN W. WYCHE III, *Primary Examiner.*